(12) United States Patent
Peric et al.

(10) Patent No.: US 9,621,201 B1
(45) Date of Patent: Apr. 11, 2017

(54) SYSTEMS AND METHODS FOR EMULATING AN INTERFERENCE ENVIRONMENT

(71) Applicant: QRC, INC., Fredericksburg, VA (US)

(72) Inventors: Sinisa Peric, Bethesda, MD (US); Jeffrey D. Lazzuri, Fredericksburg, VA (US); Raymond Everett Babineau, Jr., Fredericksburg, VA (US); Thomas F. Callahan, III, Spotsylvania, VA (US)

(73) Assignee: QRC, INC., Fredricksburg, VA (US)

( * ) Notice: Subject to any disclaimer, the term of this patent is extended or adjusted under 35 U.S.C. 154(b) by 0 days.

(21) Appl. No.: 14/974,085

(22) Filed: Dec. 18, 2015

(51) Int. Cl.
H04L 25/03 (2006.01)
H04B 1/04 (2006.01)
H04B 17/10 (2015.01)
H04B 15/00 (2006.01)

(52) U.S. Cl.
CPC .......... *H04B 1/0475* (2013.01); *H04B 15/00* (2013.01); *H04B 17/10* (2015.01)

(58) Field of Classification Search
CPC ...... G01R 23/00; G01S 13/106; G01S 7/4052
USPC ...... 375/296; 324/76.51; 342/169; 455/115.1
See application file for complete search history.

(56) References Cited

U.S. PATENT DOCUMENTS

| | | | |
|---|---|---|---|
| 7,349,503 B2 | 3/2008 | Husted et al. | |
| 8,412,111 B2 | 4/2013 | Talwar et al. | |
| 8,615,206 B2 | 12/2013 | Meng | |
| 8,763,004 B1 | 6/2014 | Callahan, III | |
| 2003/0011514 A1* | 1/2003 | Kirchofer | G01S 19/21 342/372 |
| 2010/0226454 A1* | 9/2010 | Bliss | H04L 27/2655 375/267 |
| 2013/0102254 A1* | 4/2013 | Cyzs | H04B 1/126 455/63.1 |

(Continued)

FOREIGN PATENT DOCUMENTS

| | | |
|---|---|---|
| CN | 201476875 U | 5/2010 |
| CN | 202794534 U | 3/2013 |

(Continued)

OTHER PUBLICATIONS

Boano, et al., "Controllable Radio Interference for Experimental and Testing Purposes in Wireless Sensor Networks", www.soda.swedish-ict.se, 8 pages, (Apr. 20, 2015).

(Continued)

*Primary Examiner* — Leila Malek
(74) *Attorney, Agent, or Firm* — The Marbury Law Group, PLLC

(57) ABSTRACT

Methods and systems for emulating an interference environment include combining a plurality of emulated interfering signals and transmitting the plurality of emulated interfering signals using at least one transmitter. The methods and systems may further include receiving a selection of a frequency region, where the plurality of emulated interference signals are transmitted in all or part of the selected frequency region. The selected frequency region may be at least partially within an Industrial, Scientific and Medical (ISM) radio band. The plurality of emulated interfering signals may be transmitted to at least one device to test the interference immunity of the at least one device.

20 Claims, 9 Drawing Sheets

(56) References Cited

U.S. PATENT DOCUMENTS

| | | | | |
|---|---|---|---|---|
| 2013/0308940 A1* | 11/2013 | Kpodzo | ............... | H04B 1/1027 |
| | | | | 398/39 |
| 2014/0079235 A1* | 3/2014 | Lyons | .................. | G10K 11/178 |
| | | | | 381/71.6 |
| 2015/0270917 A1* | 9/2015 | Roman | .................. | H04J 11/005 |
| | | | | 370/329 |

FOREIGN PATENT DOCUMENTS

| | | |
|---|---|---|
| CN | 102158242 B | 7/2013 |
| DE | 102007034851 A1 | 1/2009 |

OTHER PUBLICATIONS

Spirent Communications of Eatontown, L.P., "Spirent Communications TAS 4600A Noise and Interference Emulator Operations Manual", 168 pages, (2001).

ITU, "Radio Regulations of the International Telecommunication Union Radiocommunication Sector (ITU-R) (2012 Ed.)", 432 pages, (2012).

* cited by examiner

SYSTEMS AND METHODS FOR EMULATING AN INTERFERENCE ENVIRONMENT

BACKGROUND

Various types of communication devices are known that operate by transmitting and/or receiving signals (such as radiofrequency (RF) signals) within a particular frequency region (i.e., band). When designing and testing such devices, it may be desirable to determine the device's capability to withstand interference from various sources. However, current procedures and systems for testing interference immunity have limited flexibility and are inadequate for accurately determining the device's ability to withstand interference that may be encountered in the actual operating environment of the device.

SUMMARY

The various embodiments include methods and systems for emulating an interference environment that may be used, for example, to test the interference immunity of a device.

In one embodiment, a method for emulating an interference environment includes combining a plurality of emulated interfering signals of different types and transmitting the plurality of emulated interfering signals using at least one transmitter. In various embodiments, the method may further include receiving a selection of a frequency region, where the plurality of emulated interference signals are transmitted in all or part of the selected frequency region. The selected frequency region may be at least partially within an Industrial, Scientific and Medical (ISM) radio band. The plurality of emulated interfering signals may be transmitted to at least one device to test the interference immunity of the at least one device.

In various embodiments, the different types of individual signals within the plurality of the emulated interfering signals may differ from one another by at least one of a modulation scheme, a bandwidth, a symbol rate, a packetization scheme and an error protection scheme. The plurality of emulated interfering signals may also have at least one of a different occupied frequency range and a different power. In embodiments, the emulated interfering signals may include at least one of a continuous wave (CW) signal, a pulsed signal, a wireless personal area network (WPAN) signal, a wireless local area network (WLAN) signal, a cordless telephone signal, a baby monitor signal, and a Long Term Evolution (LTE) signal.

In various embodiments, the plurality of emulated interfering signals may be combined randomly. In various embodiments, the plurality of emulated interfering signals may be selected from a pre-determined set of interfering signals from within a selected frequency region. In various embodiments, the method may further include providing a plurality of different selectable environments (e.g., via a user interface) and receiving a selection of an environment, where the plurality of emulated interfering signals are combined based on the selected environment. The plurality of selectable environments may include, for example, a home environment, an office environment and a public environment. The plurality of emulated interfering signals may be selected from a pre-determined set of signals associated with the selected environment.

Various embodiments may also include providing a plurality of selectable options that enable a selection of an interference environment with increasing specificity, where the plurality of emulated interfering signals may be combined based on one or more selected options. In some embodiments, the plurality of selectable options may enable the selection of at least one particular interference source, and the plurality of emulated interfering signals may include at least one emulated signal from the selected at least one particular interference source. The at least one particular interference source may include, for example, at least one of a microwave oven, an 802.11 WLAN source, an 802.15 WPAN source, a cordless telephone, a baby monitor and an LTE source. The plurality of selectable options may enable a selection of at least one of an occupied frequency range of the selected interference source and a power of the selected interference source.

Alternatively, or in addition, the plurality of selectable options may enable the selection of at least one interference target, such as a particular device or type of device for which the interference immunity is being tested, where the plurality of emulated interfering signals may be combined based the selected at least one interference target. The at least one interference target may be, for example, at least one of a WLAN device, a WPAN device, a cordless telephone, a baby monitor device, a cellular device, such as an LTE device, or a near-field communication (NFC) device.

In various embodiments, combining a plurality of emulated interfering signals may include generating one or more interfering signals and/or accessing one or more stored emulated interfering signals.

In another embodiment, a method for emulating an interference environment includes combining three or more emulated interfering signals, and transmitting the three or more emulated interfering signals using at least one transmitter.

Various embodiments include interference emulator systems configured to perform operations of the embodiment methods disclosed herein. Various embodiments also include interference emulator systems including means for performing functions of the embodiment methods disclosed herein. Various embodiments also include non-transitory processor-readable storage media having stored thereon processor-executable instructions configured to cause a processor to perform operations of the embodiment methods disclosed herein.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
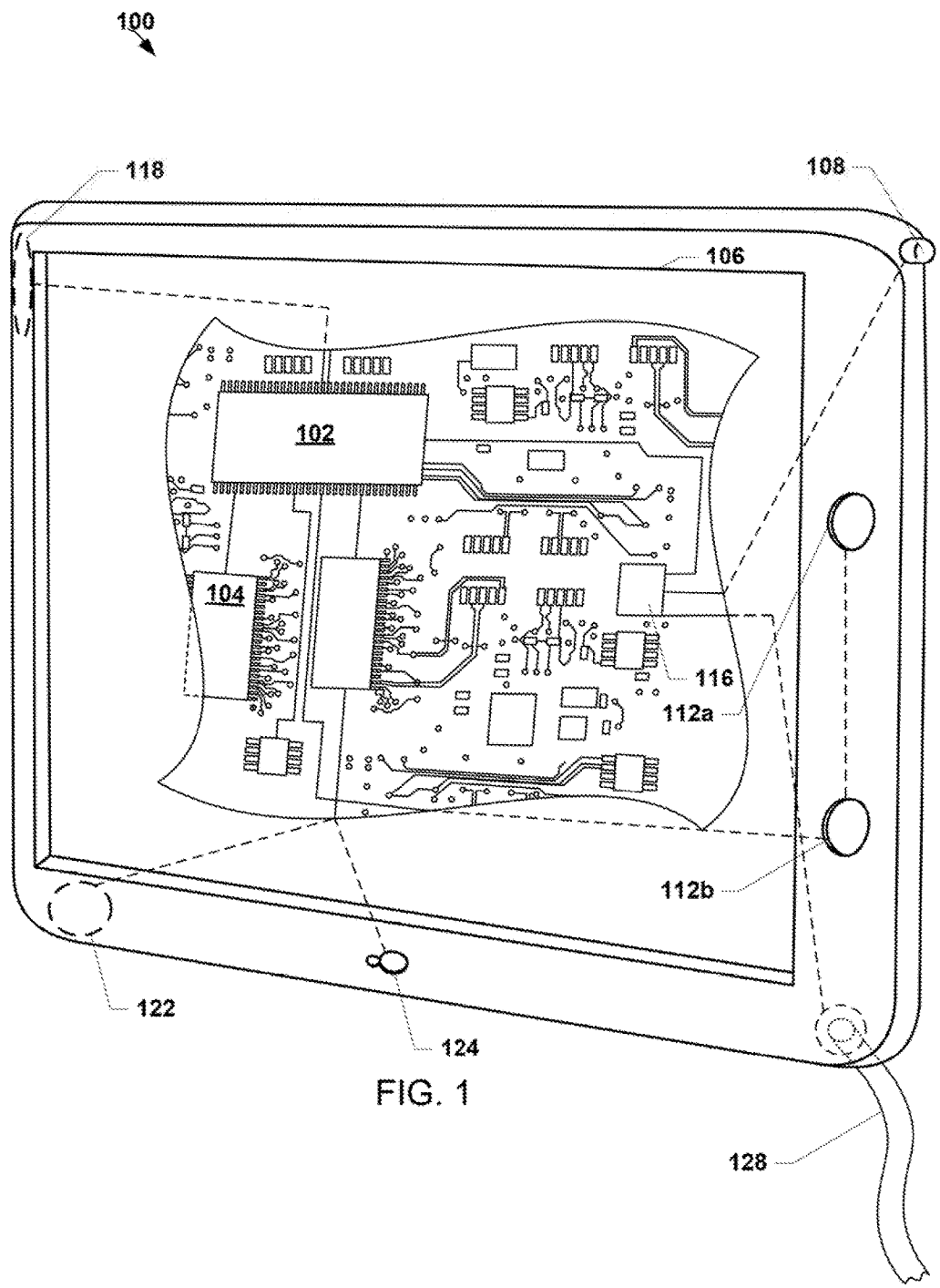
FIG. 1 is an illustration of an example system for emulating an interference environment according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, various embodiments relate to methods and systems for emulating an interference environment, such as an interference environment within a particular frequency region. Various embodiments may be used, for example, to test the interference immunity of a particular device or communication system.

A problem in designing and testing devices which operate in a particular frequency region (i.e., band) is that it is difficult to determine the device's capability to withstand interference that may be encountered in the actual operating environment of the device. This may be particularly true, for example, for devices that operate in a frequency region that has limited regulatory protection from interfering signals, such as devices that operate in the Industrial, Scientific and Medical (ISM) radio bands. The ISM radio bands refer to a set of radio bands (i.e., portions of the radio spectrum) that have been reserved for unlicensed industrial, scientific and medical purposes. Due to the fact that any devices can use ISM bands for these purposes up to a certain transmit power level, interference present in the ISM bands cannot be controlled. This is in contrast to bands licensed to specific entities (e.g., part of Personal Communications Systems (PCS) band licensed to a single operator for cellular communications) that generates all the signals in their licensed spectrum and therefore can control the amount of interference present in it. The ISM bands are defined by the International Telecommunication Union Radiocommunication Sector (ITU-R) in §§5.138, 5.150 and 5.280 of the Radio Regulations (2012 Ed.), which is incorporated by reference herein. Exemplary ISM bands include, for example, 915 MHz (±13 MHz), 2.45 GHz (±50 MHz) and 5.8 GHz (±75 MHz).

The ISM bands are generally referred to as open or unlicensed bands. In recent years, there has been an increase in the use of ISM bands for wireless communication devices. Communication devices that may operate in an ISM band include, for example, wireless local area network (WLAN) devices, including devices which operate in accordance with the IEEE 802.11 standards (e.g., Wi-Fi® devices), wireless personal area network (WPAN) devices, including devices which operate in accordance with the IEEE 802.15 standards (e.g., Bluetooth® devices), cordless telephone devices, baby monitor devices, near field communication (NFC) devices, and Long Term Evolution (LTE) devices that may operate using a License Assisted Access (LAA) protocol. Household microwave ovens also typically operate at 2.45 GHz in the middle of the ISM band.

Various embodiments include systems and methods for replicating an interference environment that a device, such as a communication device operating at least partially within an ISM radio band, might plausibly encounter in operation. This may enable improved benchmarking and testing of the interference immunity of the device.

Embodiments include methods and systems for emulating an interference environment that includes combining a plurality of emulated interfering signals of different signal types and transmitting the plurality of emulated interfering signals using at least one transmitter. In various embodiments, the method may further include receiving a selection of a frequency region, where the plurality of emulated interference signals are transmitted in all or part of the selected frequency region. The selected frequency region may be at least partially within an Industrial, Scientific and Medical (ISM) radio band. The plurality of emulated interfering signals may be transmitted to at least one device to test the interference immunity of the at least one device.

As used herein, emulated interfering signals of different signal types include two or more signals that differ from one another by at least one of a modulation scheme, a bandwidth, a symbol rate, a packetization scheme and an error protection scheme. Examples of different signal types include, without limitation, continuous wave (CW) signals, pulsed signals, wireless personal area network (WPAN) signals (e.g., Wi-Fi® signals), wireless local area network (WLAN) signals (e.g., Bluetooth® signals), cordless telephone signals, baby monitor signals, and wireless wide area network (WWAN) signals (e.g., LTE signals). Two signals of the same waveform that differ from each other only with respect to their center frequency and/or their power would not be considered signals of different signal types. It will be understood that a plurality of emulated interfering signals of different signal types may include multiple signals of the same signal type, so long as there are at least two signals of different signal types within the plurality of emulated interfering signals.

Further embodiments include methods and systems for emulating an interference environment that includes combining three or more emulated interfering signals (e.g., between 3 and about 20 emulated interfering signals, such as between 4 and about 10 emulated interfering signals) and transmitting the three or more emulated interfering signals using at least one transmitter. The three or more emulated interfering signals may include signals of different signal types or may all be of the same signal type. The three or more emulated interfering signals may differ from one another by at least one of occupied frequency range and power. In various embodiments, the method may further include receiving a selection of a frequency region, where the three or more emulated interference signals are transmitted in all or part of the selected frequency region. The selected frequency region may be at least partially within an Industrial, Scientific and Medical (ISM) radio band. The three or more emulated interfering signals may be transmitted to at least one device to test the interference immunity of the at least one device.

In various embodiments, the plurality of emulated interfering signals may include a mixture of different signals that a device being tested may encounter in operation. The mixture of signals may comprise or may be selected from a known set of interfering signals that are typically present in a particular (e.g., selected) frequency region. The particular signals in the plurality of emulated interfering signals may be selected randomly and/or based on a user-selection.

Various embodiments may provide improved flexibility in configuring an emulated interference environment. A plurality of selectable options may be provided (e.g., via a user interface display) to enable the creation of an emulated interference environment with varying degrees of specificity. For example, the plurality of emulated interfering signals may be combined based on a selection of a particular frequency region. Alternately or in addition, the plurality of emulated interfering signals may be combined based on a selection of a particular environment (e.g., an office environment, a home environment, an apartment building, a mall or other public place, etc.). Alternately or in addition, the plurality of emulated interfering signals may be combined based on a selection of at least one particular interference source (e.g., an appliance, such as a microwave oven, a cordless phone, a baby monitor, a Wi-Fi® source, a Bluetooth® source, an LTE source, etc.), and optionally a selection of an occupied frequency range and/or a power of the at least one particular interference source. Alternatively or in addition, the plurality of emulated interfering signals may be based on a selection of at least one interference target (e.g., a particular device or type of device for which the interference immunity is being tested).

A system 100 for emulating an interference environment is illustrated in FIG. 1. The system 100 may include at least one transmitter and a processor coupled to the at least one transmitter and configured with processor-executable introductions to combine a plurality of emulated interfering signals (e.g., of the same or different signal types) and to transmit the plurality of emulated interfering signals using the at least one transmitter. In embodiments, the system 100 may comprise a transceiver device, such as a radiofrequency digitization and collection system (RFDCS). Examples of a transceiver device that may be adapted for use in the various embodiments are described, for example, in U.S. Pat. No. 8,763,004 and U.S. application Ser. No. 14/809,638, filed on Jul. 27, 2015, the entire contents of both of which are incorporated herein by reference.

In the example shown in FIG. 1, the system 100 (i.e., transceiver device) includes a processor 102 (e.g., a CPU) coupled to internal memory 104. Internal memory 104 may be volatile or non-volatile memory, and may also be secure and/or encrypted memory, or unsecure and/or unencrypted memory, or any combination thereof. The processor 102 may also be coupled to a touch screen display panel 106, such as a resistive-sensing touch screen, capacitive-sensing touch screen infrared sensing touch screen, or the like. Additionally, the display of the device 100 need not have touch screen capability. Additionally, the system 100 may have one or more antenna 108 for sending and receiving electromagnetic radiation (e.g., RF signals) that may be connected to a transceiver 116 coupled to the processor 102. In another embodiment, the system 100 may also receive and send RF signals over a wired RF connection 128, such as via a coaxial cable or other RF input/output feature. The system 100 may also include physical buttons 112a and 112b or similar input mechanisms (e.g., keyboard, trackball, touchpad, etc.) for receiving user inputs. The system 100 may also include a power button 118 for turning the system 100 on and off. Additionally, the system 100 may include a microphone 124 for receiving sound. The system 100 may also include a speaker 122 for converting audio signals into audible sound.

Figure 2:
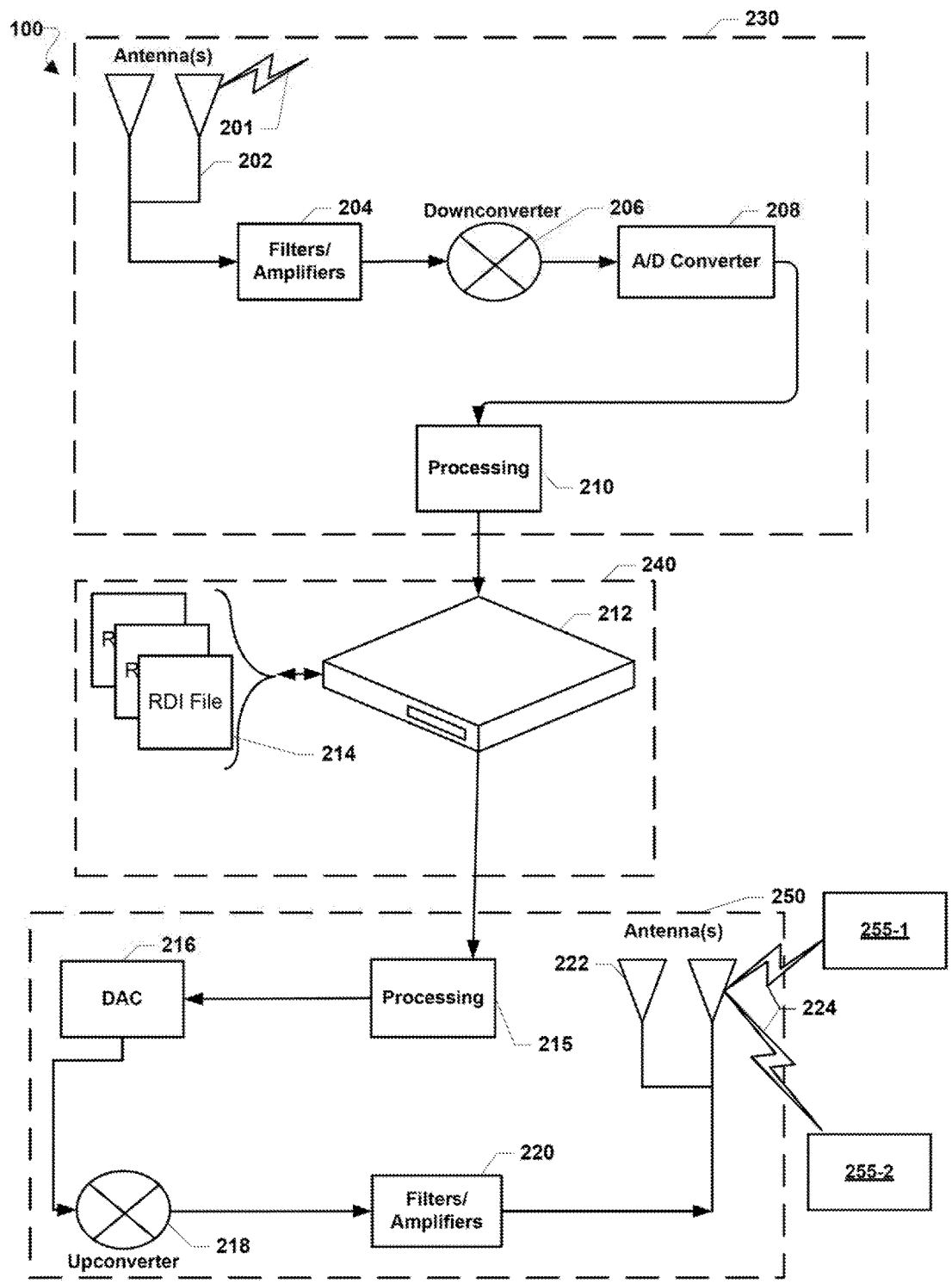
FIG. 2 is a block component diagram of an transceiver device for emulating an interference environment according to an embodiment.

FIG. 2 is a component block diagram illustrating components of a system 100 for emulating an interference environment according to an embodiment. The system 100 may include at least a transmission component 250 for combining a plurality of emulated interfering signals of the same or different signal types and transmitting the plurality of emulated interfering signals. In some embodiments, the system 100 may also include a data storage/retrieval component 240 and/or a collection component 230.

In an embodiment, the collection component 230 of the system 100 may receive RF signals. The collection component 230 may include various sub-components, such as a filters/amplifiers unit 204, a downconverter 206, an analog-to-digital converter (i.e., A/D converter) 208, and a processing unit 210. One or more antennas 202 may wirelessly receive an analog RF signal 201, such as a radio wave. In another embodiment (not shown), the collection system 230 may receive RF signals directly through a wired RF connection, such as a coaxial cable. The filters/amplifiers unit 204 (e.g., a high-pass filter unit) may filter and/or amplify the captured analog RF signal 201. The filtered RF signal may be passed to a downconverter 206 and then to the A/D converter 208. The A/D converter 208 may use various techniques to convert the analog signal into a digital signal. After finishing converting the analog RF signal 201 to a digital RF signal, the A/D converter 208 may pass the converted digital signal to a processing unit 210 for additional processing. The processed digital signal may be sent for storage and later retrieval in the data storage/retrieval system 240.

The data storage/retrieval component 240 of the system 100 may include a persistent memory 212 (e.g., a hard drive or other non-volatile memory component, such as a Secure Digital (SD) memory card), as shown in FIG. 2. In embodiments, the persistent memory 212 may maintain processed digital signals in the form of RF digital information (RDI) files 214. RDI files 214 may contain digital representations of received RF signal information. In an embodiment, the contents of a "RF Digital Information (RDI)" file may be in many formats, but may generally include an in-phase amplitude measurement of the signal (I) and generally (but not necessarily) also a 90 degree phase-shifted (quadrature) amplitude measurement of the signal (Q). Additional "meta data" that specifies pertinent information about the IQ data may also be present in RDI files 214.

The transmission component 250 of the system 100 may include a processing unit 215, a digital-to-analog converter (DAC 216), an upconverter 218, a filters/amplifiers unit 220, and one or more antennas for transmitting an analog signal 224. In preparation for transmission (e.g., playback), a processing unit 215 may process the digital signal received from the persistent memory 212 using various known techniques. In one embodiment, the processing unit 210 and the processing unit 215 may be the same processing unit (e.g., a central-processing unit (CPU) or a digital signal processor (DSP)). In another embodiment, the processing units 210, 215 may be separate components (e.g., the processing unit 210 may be a DSP and the processing unit 215 may be a CPU). In yet another embodiment, the processing units 210, 215 may be one or more cores in one or more multi-core processing units, such as a quad- or dual-core DSP.

The processing unit 215 may send the processed digital signal to the DAC 216 of the transmission component 250. The DAC 216 may convert the digital signal into an analog signal. After converting the digital signal, the DAC 216 may send the converted digital signal to an upconverter 218, which may apply various other transforms to the converted analog signal before sending the converted analog signal to a filters/amplifiers unit 220. The filters/amplifiers unit 220 may apply additional transforms to the converted analog signal and may send the converted analog signal to the antenna(s) 222 for transmission as an analog signal 224. In another embodiment (not shown), the transmission component 250 may transmit the converted analog signal through a wired RF connection, such as a coaxial cable.

In some embodiments, the processing unit 215 may be configured with software instructions to combine a plurality of emulated interfering signals of the same or different signal types for transmission by the transmission component 250. In some embodiments, combining a plurality of emulated interfering signals may include generating, by the processing unit, one or more of the emulated interfering signals for transmission by the transmission component 250. Alternately or in addition, combining a plurality of emulated interfering signals may include accessing, by the processing unit 215, one or more stored signals (e.g., from the data storage/retrieval component 240 of the system 100). In some embodiments, the stored signal(s) may be previously generated by the processing unit 215 and sent to the data storage/retrieval component 240 for subsequent retrieval. In some embodiments, the stored signal(s) may include one or more signals (e.g., RF signals) received and optionally processed by the collection component 230 as described above, and sent for storage and later retrieval in the data storage/retrieval system 240.

In embodiments, the plurality of emulated interfering signals may be transmitted by the transmission component 250 to at least one separate device 255 in order to test the interference immunity of the at least one device 255, as schematically illustrated in FIG. 2. The plurality of emulated interference signals may be transmitted wirelessly to the at least one device 255-1, 255-2, as shown in FIG. 2, or via a wired connection, such as a coaxial cable.

As described in U.S. Pat. No. 8,763,004 and U.S. application Ser. No. 14/809,638, which are incorporated by reference herein, the system 100 (e.g., a transceiver device) may include one or more applications (apps) that may be used to control and/or modify the operations of one or more of the collection component 230, the data storage/retrieval component 240 or the transmission component 250. For example, one or more apps may modify the behavior of any combination of the various sub-components 204, 206, 208, and 210 of the collection system 230 and may cause any of the sub-components 204, 206, 208, and 210 to apply various transforms to the analog RF signal 201 as it is converted from analog to digital. One or more apps may optionally perform transformations on the digital signal(s) (e.g. RDI files 214) stored by the data storage/retrieval component. In addition, one or more apps may modify the behavior of any of the processing unit 215, DAC 216, upconverter 218, and filters/amplifiers unit 220 of the transmission component 250 to change various characteristics of a signal (i.e., an emulated interfering signal) transmitted by the transmission component 250. The one or more apps may include one or more RIC apps which execute, at least in part, on a reconfigurable integrated circuit (RIC), such as an FPGA or CPLD, as described in U.S. application Ser. No. 14/809,638.

Figure 3:
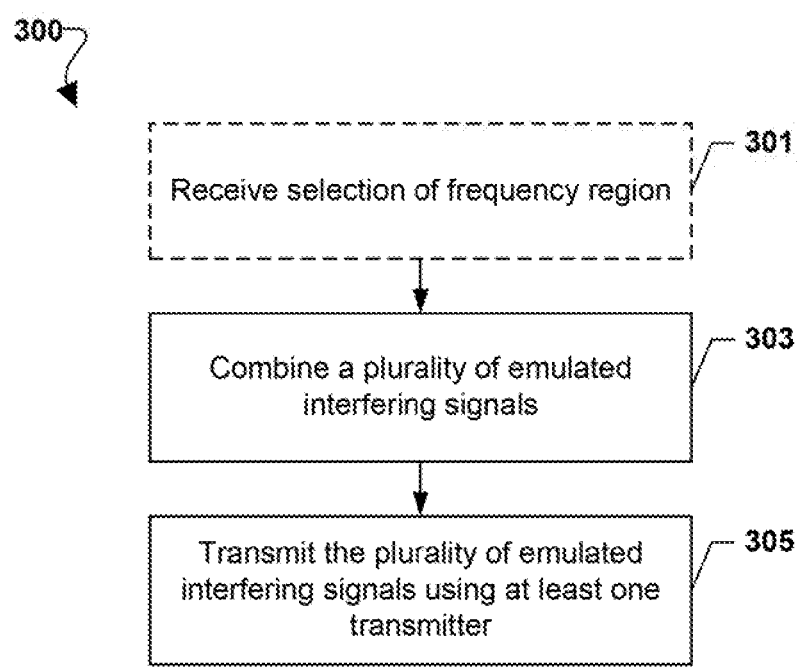
FIG. 3 is a process flow diagram illustrating an embodiment method for emulating an interference environment.

FIG. 3 is a flow diagram illustrating an embodiment method 300 for emulating an interference environment. In an embodiment, a system 100 such as described in FIGS. 1 and 2 may be used to perform the method 300. In some embodiments, the method 300 may be implemented as application software (i.e., an app) running on a radiofrequency transceiver device (e.g., an RFDCS), as described above.

In optional block 301 of method 300, a selection of a frequency region may be received. The selected frequency region may be at least partially within an Industrial, Scientific and Medical (ISM) radio band. In some embodiments, the selection of a frequency region may be received via a user input on a user interface of the system 100. In other embodiments, the selection of a frequency region may be received from another software process (e.g., an app) running on the system 100 or from another device which may be connected to the system 100 via a suitable network connection.

In block 303, a plurality of emulated interfering signals may be combined. In embodiments, the plurality of emulated interfering signals may be of different signal types, where the different signal types may differ from one another by at least one of a modulation scheme, a bandwidth, a symbol rate, a packetization scheme and an error protection scheme. Alternately, the plurality of emulated interfering signals may be three or more emulated interfering signals that may be of different signal types or of the same signal type. In addition, the plurality of different signals may differ from one another by their occupied frequency range(s) and/or their power.

In embodiments, the plurality of emulated interfering signals may include at least one of a continuous wave (CW) signal, pulsed signal, a wireless personal area network (WPAN) signal, such as a signal substantially corresponding to the IEEE 802.15 standards (e.g., a Wi-Fi® signal), a wireless local area network (WLAN) signal, such as a signal substantially corresponding to the IEEE 802.15 standards (e.g., a Bluetooth® signal), a cordless telephone signal, a baby monitor signal, and a signal substantially corresponding to the Long Term Evolution (LTE) protocol. As discussed above, the signals may be generated internally by the system 100 or may be retrieved from a storage component.

In some embodiments, the plurality of emulated interfering signals may be combined in a random fashion. In other embodiments, the plurality of emulated interfering signals may be combined to substantially replicate an interference environment that is likely to be encountered in operation. For example, in response to receiving a selection of a frequency region in optional block 301, the plurality of emulated interfering signals that are combined may be selected from a pre-determined set of interfering signals (e.g., type(s) of signals) that are known to exist within the selected frequency region.

In block 305, the plurality of emulated interfering signals may be transmitted using at least one transmitter. As discussed above, the plurality of emulated interfering signals may be transmitted wirelessly or via a wired connection to at least one device to test an interference immunity of the at least one device. In embodiments, the plurality of emulated interfering signals may be transmitted within a particular frequency region, such as at least partially within an ISM band. The plurality of emulated interfering signals may be transmitted within a particular (i.e., selected) frequency region in response to receiving a selection of a frequency region in optional block 301.

Figure 4:
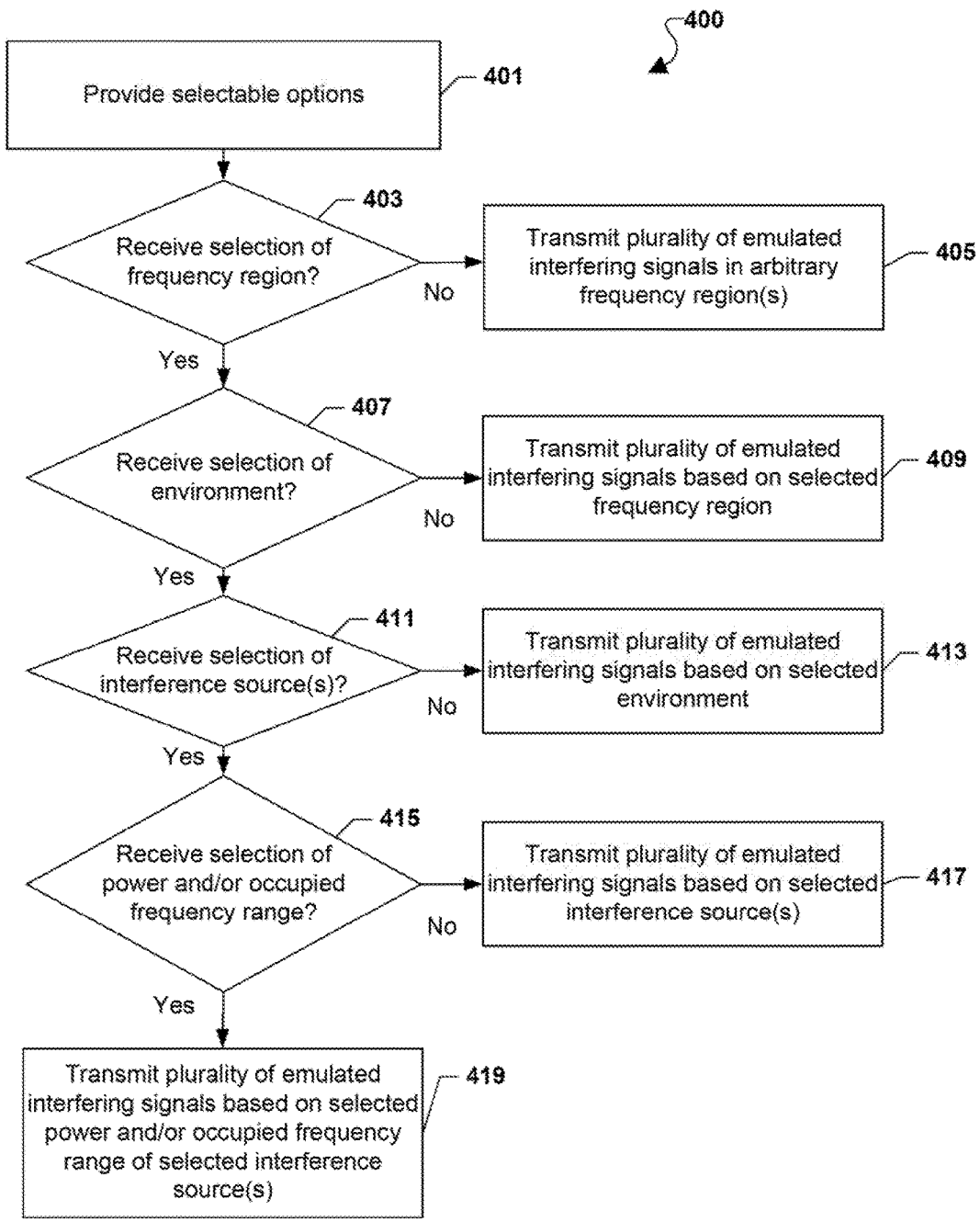
FIG. 4 is a process flow diagram illustrating another embodiment method for emulating an interference environment that includes providing a plurality of selectable options to facilitate the creation of customized emulated interference environments with varying degrees of specificity.

FIG. 4 is a flow diagram illustrating another embodiment method 400 for emulating an interference environment that includes providing a plurality of selectable options (e.g., via a user interface display) to facilitate the creation of customized emulated interference environments with varying degrees of specificity. The method 400 of FIG. 4 may be implemented by a system for emulating an interference environment, such as the system 100 (e.g., transceiver device) described above with reference to FIGS. 1 and 2. FIGS. 5A-5D illustrate an example of a transceiver device 500 displaying a user interface for generating a customized emulated interference environment.

Figure 5A:
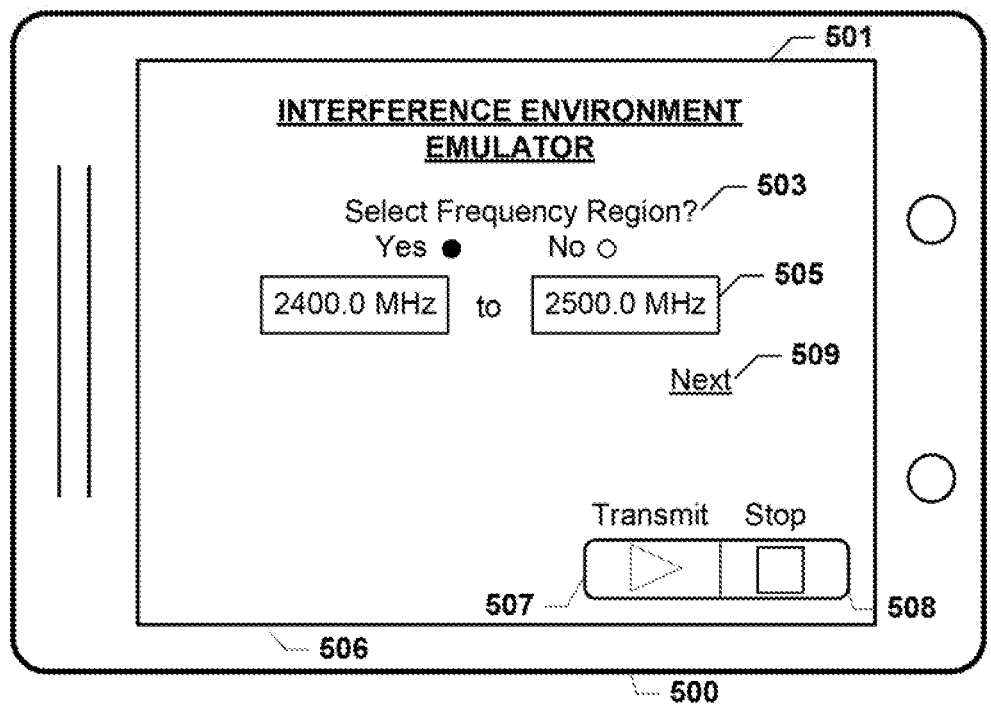
FIGS. 5A-5E illustrate user interface screens on a display panel of a transceiver device for enabling user selection of an emulated interference environment.

The method 400 shown FIG. 4 is one example of an embodiment method that includes providing a plurality of selectable options that enable a selection of an interference environment with increasing specificity. In block 401 of method 400, selectable options may be provided. This may include, for example, displaying on a user-interface a user-selectable option to select a frequency region. An example of this is illustrated in FIG. 5A, which shows a display panel 506 of a transceiver device 500 for emulating an interference environment that includes a user-interface screen 501. In this example, the user interface screen 501 includes user-selectable graphical control elements 503, 505 (which may be, for example, one or more buttons, lists or text boxes, icons, hyperlinks, etc.) that enable a user to select (e.g., input) a particular frequency region.

In other embodiments, providing an option to select a frequency region may include sending a request for a selection of a frequency region (e.g., to another software process running on the device and/or to another device).

In determination block 403, a determination may be made whether a selection of a frequency region has been received. In response to determining that a selection of a frequency region is not received (i.e., determination block 403="No"), the system 100 may combine and transmit a plurality of emulated interfering signals in block 405. The plurality of emulated interfering signals may be randomly or arbitrarily selected signals and may be transmitted at any arbitrarily selected frequencies. In response to determining that a selection of a frequency region has been received (i.e., determination block 403="Yes"), a determination may be made whether a selection of a particular environment is received in determination block 407. For example, a selectable list or menu of different environments may be displayed on a user-interface. (See, e.g., FIG. 5B, described below). Alternately, a request for a selection of an environment may be sent to another software process or device. The different environments may include, for example, a home environment (e.g., a house or apartment/condominium), an office environment, a public environment (e.g., an indoor environment, such as a shopping mall, or an outdoor environment, such as a public park), etc.

In response to determining that a selection of an environment is not received (i.e., determination block 407="No"), the system 100 may combine and transmit a plurality of emulated interfering signals based on the selected frequency region in block 409. In embodiments, the emulated interfering signals may be selected from a pre-determined set of signals known to be present in the selected frequency region. The signals may be transmitted at least partially within the selected frequency region. In response to determining that a selection of an environment is received (i.e., determination block 407="Yes"), a determination may be made whether a selection of at least one particular interference source is received in determination block 411. For example, a selectable list or menu of different interference sources may be displayed on a user-interface. (See, e.g., FIG. 5C, described below). Alternately, a request for a selection of at least one particular interference source may be sent to another software process or device. The particular interference sources may include, for example, a microwave oven, an 801.11 WLAN source (e.g., a Wi-Fi® source), an 802.15 WPAN source (e.g., a Bluetooth® source), a cordless telephone, a baby monitor, and/or an LTE source. In some embodiments, the selectable options of particular interference sources (e.g., displayed on a user interface) may be based on the selection of a frequency region in determination block 403 and/or the selection of an environment in determination block 407. For example, the menu or list of interference sources provided may be selected to include interference sources that are known (e.g., through experience or empirical study) to be most likely present in the selected frequency region and/or the selected environment.

In response to determining that a selection of at least one particular interference source is not received (i.e., determination block 411="No"), the system 100 may combine and transmit a plurality of emulated interfering signals based on the selected environment in block 413. In embodiments, the emulated interfering signals may be selected from a pre-determined set of signals known to be present in the selected environment. The signals may be transmitted at least partially within the selected frequency region. In response to determining that a selection of at least one particular interference source is received (i.e., determination block 411="Yes"), a determination may be made whether a selection of an occupied frequency range and/or power is received in determination block 415. Different user-selectable graphical elements may be displayed on a user-interface to enable the use to select occupied frequency range and/or power (See, e.g., FIG. 5D, described below) of the selected interference source. Alternately, a request for a selection of an occupied frequency range and/or power of the selected interference source may be sent to another software process or device. The particular occupied frequency range of the selected interference source might be specified as a center frequency and bandwidth of this interference source. Some signals can have different selectable bandwidths. For example, WiFi signals can have 20 or 40 MHz bandwidth and LTE signals can have 1.4, 3, 5, 10, 15, or 20 MHz bandwidth.

In response to determining that a selection of occupied frequency range and/or power is not received (i.e., determination block 415="No"), the system 100 may combine and transmit a plurality of emulated interfering signals based on the selected at least one interference source in block 417. In particular, the plurality of emulated interfering signals may include the at least one particular interference source. The at least one particular interference source may be transmitted at least partially within the selected frequency region and may have an arbitrarily selected occupied frequency range and/or power. In response to determining that a selection of occupied frequency range and/or power is received (i.e., determination block 415="Yes"), the system 100 may combine and transmit a plurality of emulated interfering signals based on the selected power and/or occupied frequency range of the selected at least one interference source in block 419. In particular, the plurality of emulated interfering signals may include the at least one particular interference source. The at least one particular interference source may be transmitted at least partially within the selected frequency region and may be transmitted at the selected occupied frequency range and/or selected power.

In some embodiments, the plurality of selectable options that are provided may optionally enable the selection of at least one interference target, such as a particular device or type of device for which the interference immunity is being tested. For example, a selectable list or menu of different interference targets may be displayed on a user-interface. An example of this is illustrated by FIG. 5E which shows a display panel 541 on a user-interface screen 501 of a transceiver device 500 that includes a plurality of user-selectable options 543 for selecting at least one particular interference target. Alternately, a request for a selection of at least one interference target may be sent to another software process or device. The at least one interference target may include, without limitation, at least one of a WLAN device (e.g., a Wi-Fi device), a WPAN device (e.g., a Bluetooth device), a cordless telephone device, a baby monitor device, a cellular device (e.g., an LTE device), or a near-field communication (NFC) device.

In some embodiments, at least one interference target may be selected following the selection of a particular frequency region (see, e.g., block 301 of FIG. 3). The plurality of selectable options for enabling a selection of one or more interference target may be provided based, at least in part, on the selected frequency region. For example, the at least one interference target may be selected from a set of interference targets that operate at least partially within, or optionally adjacent to, the selected frequency region. Alternatively, the selection of at least one interference target may serve as a proxy selection of one or more frequency regions. For example, the selection of a particular interference target that operates within a given frequency region may function as a selection of the frequency region in which to combine and transmit a plurality of emulated interfering signals.

The plurality of emulated interfering signals may be combined and transmitted based at least in part on a selection of at least one interference target. For example, a user may specify that a particular target device is being tested (e.g., a WiFi device) to assess its interference immunity. The system 100 may combine and transmit a plurality of emulated interfering signals to include a mixture of signals that are known (e.g., through experience or empirical study) to be most detrimental to the target device from an interference standpoint.

The selection of at least one particular interference target may be utilized in combination with the selection of a frequency region, environment, types of interference source (s), power and/or occupied frequency range of particular interference sources, as described above with reference to FIG. 4, and may provide a user with a high-degree of flexibility for generating an emulated interference environment.

Thus, in various embodiments, an interference environment may be defined with increasing specificity (e.g., with respect to frequency region, environment, interference target (s), types of interference source(s), power and/or occupied frequency range of particular sources) in accordance with the embodiment method. It will be understood that various embodiments may include modifications to the above-described method, including with respect to the number of and/or ordering of the method steps.

FIGS. 5A-5E illustrate an exemplary sequence of user interface screens 501, 511, 521, 531, 541 on a display panel 506 of transceiver device 500 that may be used to implement the method of FIG. 4. As discussed above, the user interface screen 501 shown in FIG. 5A includes user-selectable graphical control elements 503, 505 (which may be, for example, one or more buttons, lists or text boxes, icons, hyperlinks, etc.) that enable a user to select (e.g., input) a particular frequency region. If the user does not select (e.g., input) a particular frequency region, the transceiver device 500 may proceed to combine and transmit a plurality of emulated interfering signals. The signals may be transmitted in all or part of an arbitrarily selected frequency region. The user interface screen 501 may include user-selectable graphical control elements 507, 508 that enable the user to start and stop the transmission of the emulated interfering signals. If the user selects (e.g., inputs) a particular frequency region, the user may begin transmitting the interfering signals in the selected frequency region (e.g., by clicking the "Transmit" button 507), or may navigate to a different screen (e.g., by clicking the "Next" icon 509). Alternately, in some embodiments the user may skip the selection of a frequency region and proceed to the next interface screen.

Figure 5B:
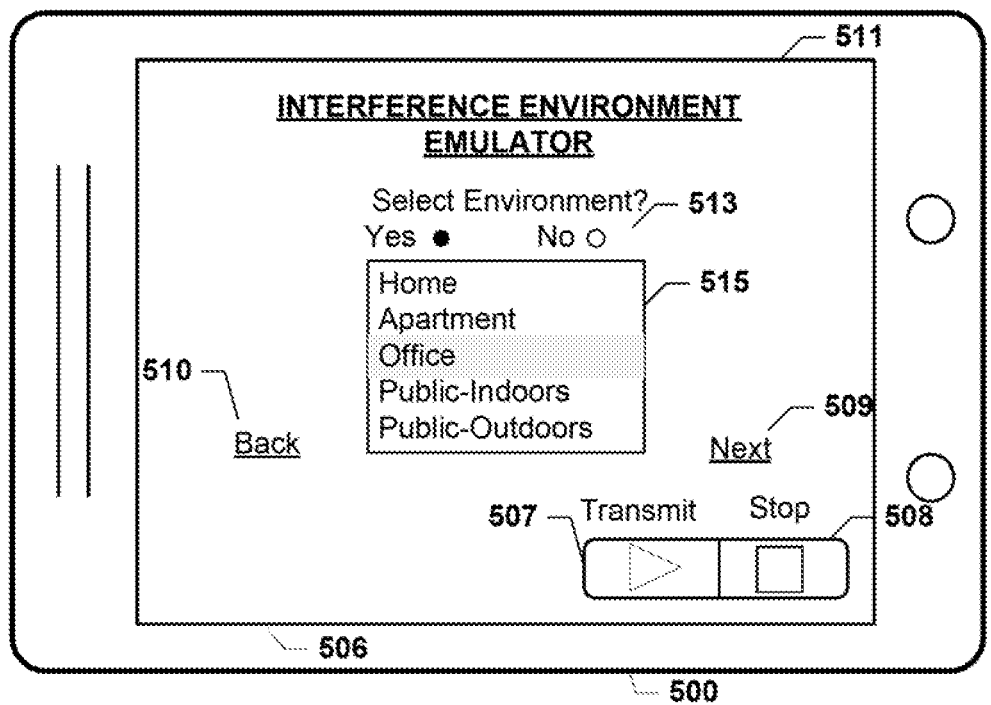

FIG. 5B illustrates an interface screen 511 that includes user-selectable graphical elements 513, 515 that enable the user to select a particular environment (e.g., Home, Apartment, Office, Public-Indoors, Public-Outdoors, etc.). The user may begin transmitting the plurality of interfering signals by selecting the "Transmit" button 507, with or without first selecting a particular environment. When the user selects a particular environment, the signals that are transmitted may include interfering signals associated with the selected environment. The user may navigate to the next screen (e.g., as shown in FIG. 5C) or to the preceding screen (e.g., as shown in FIG. 5A) by selecting the "Next" or "Back" icons 509, 510, respectively.

Figure 5C:
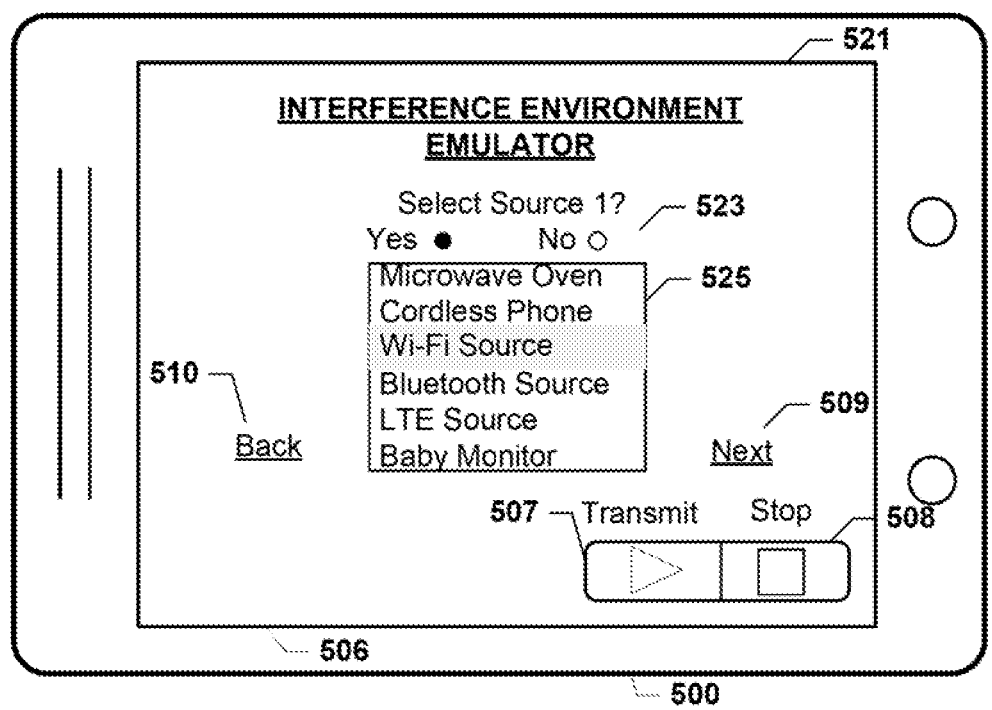

FIG. 5C illustrates an additional interface screen 521 that includes user-selectable graphical elements 523, 525 that enable the user to select a particular interference source (i.e., "Source 1"). The user may begin transmitting the plurality of interfering signals by selecting the "Transmit" button 507, with or without first selecting a particular interference source. The user may navigate to the next screen (e.g., as shown in FIG. 5D) or the preceding screen (e.g., as shown in FIG. 5B) by selecting the "Next" or "Back" icons 509, 510.

Figure 5D:
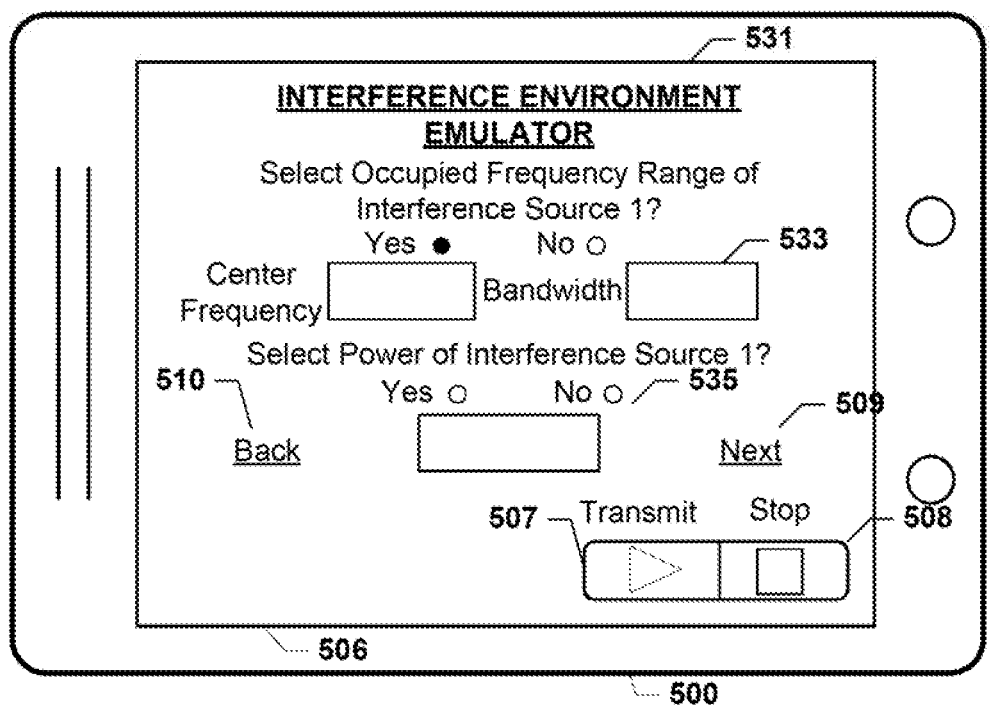
Figure 5E:
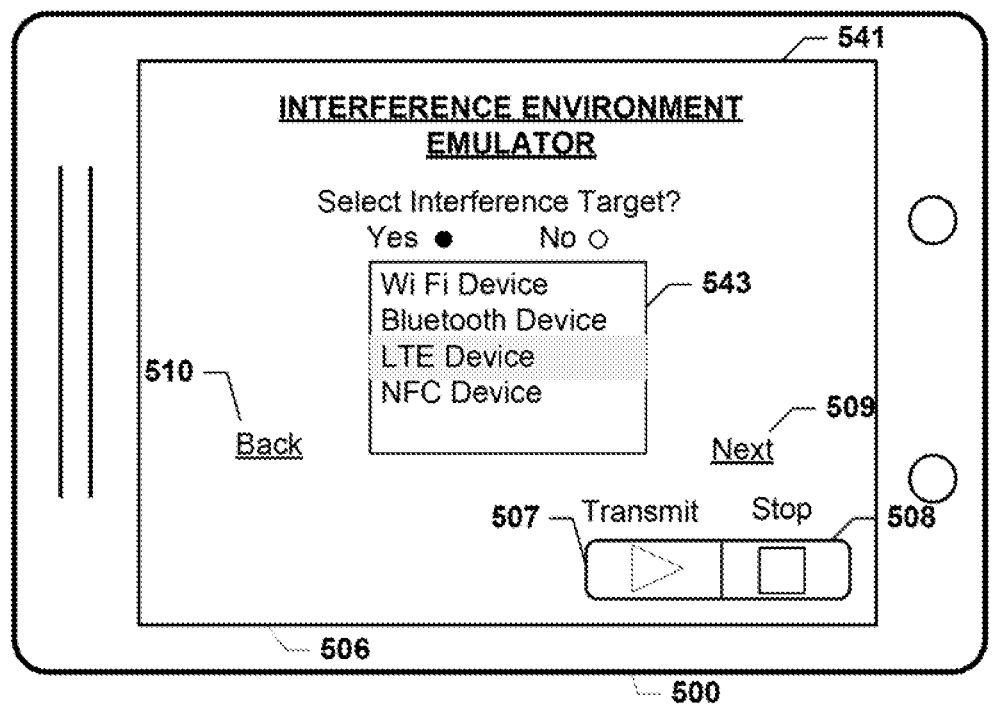

FIG. 5D illustrates an additional interface screen 531 that includes user-selectable graphical elements 533, 535 that enable the user to select an occupied frequency range and/or power of a particular interference source. The user may navigate to the next screen by selecting the "Next" icon 509, which may display a screen similar to FIG. 5C to enable the user to select an additional interference source (i.e., Source 2). The user may return to the previous screen by selecting the "Back" icon 510.

FIG. 5E illustrates an additional interface screen 541 that includes user-selectable graphical elements 543 that enable the user to select at least one interference target.

While various embodiments have been described with reference to emulating an electromagnetic (e.g., RF) interference embodiment, embodiments may be used to emulate other types of interference environments, such as acoustic or optical interference environments. In the case of emulating an acoustic interference environment, for example, a system 100 such as shown in FIG. 2 may include a transmission component 250 having one or more sources of acoustic energy (e.g., speaker(s), transducer(s), etc.) and associated circuitry for transmitting a plurality of emulated interfering acoustical signals of the same or different types which may be selected and combined in accordance with the various embodiments described above. Similarly, with respect to emulating an optical interference environment, a system 100 may include a transmission component 250 having one or more sources of optical energy (e.g., LED(s), laser(s), lamp source(s), etc.) and associated circuitry for transmitting a plurality of emulated interfering optical signals of the same or different types which may be selected and combined in accordance with the various embodiments described above.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for emulating an interference environment, comprising:
    providing, by a processor, a plurality of selectable options that enable generation of different interference environments to emulate, wherein the plurality of selectable options include a plurality of different interference environments;
    receiving, by the processor, one or more selected options from amongst the plurality of selectable options, wherein the one or more selected options includes a selected interference environment;
    combining, by the processor, a plurality of emulated interfering signals accessed from a memory or automatically generated in response to receiving the one or more selected options, wherein the combined plurality of emulated interfering signals emulate interference present in the selected interference environment; and
    transmitting, by the processor, the combined plurality of emulated interfering signals using at least one transmitter to generate the emulated interference environment for testing an interference immunity of at least one target device.

2. The method of claim 1, further comprising:
    receiving a selection of a frequency region, wherein the combined plurality of emulated interfering signals are transmitted in all or part of the selected frequency region.

3. The method of claim 2, wherein the selected frequency region is at least partially within an Industrial, Scientific and Medical (ISM) radio band.

4. The method of claim 1, wherein the plurality of emulated interfering signals differ from one another by at least one of a modulation scheme, a bandwidth, a symbol rate, a packetization scheme and an error protection scheme.

5. The method of claim 1, wherein the plurality of emulated interfering signals have at least one of a different occupied frequency range and a different power.

6. The method of claim 1, wherein the plurality of emulated interfering signals comprise at least one of a continuous wave (CW) signal, pulsed signal, a wireless personal area network (WPAN) signal, a wireless local area network (WLAN) signal, a cordless telephone signal, a baby monitor signal, and a Long Term Evolution (LTE) signal.

7. The method of claim 1, wherein the plurality of emulated interfering signals are combined randomly.

8. The method of claim 2, wherein the plurality of emulated interfering signals are selected from a pre-determined set of interfering signals from within the selected frequency region.

9. The method of claim 1, wherein the plurality of emulated interfering signals are selected from a pre-determined set of signals associated with the selected interference environment.

10. The method of claim 1, wherein the plurality of different interference environments comprise at least one of a home environment, an office environment and a public environment.

11. The method of claim 1, wherein the plurality of selectable options further include a plurality of different interference sources that enable a selection of at least one particular interference source, wherein the plurality of emulated interfering signals comprise at least one emulated signal from the selected at least one particular interference source.

12. The method of claim 11, wherein the selected at least one particular interference source comprises at least one of a microwave oven, an 802.11 wireless local area network (WLAN) source, an 802.15 wireless personal area network (WPAN) source, a cordless telephone, a baby monitor, and a Long Term Evolution (LTE) source.

13. The method of claim 11, wherein the plurality of selectable options enable a selection of at least one of an occupied frequency range of the selected interference source and a power of the selected interference source.

14. The method of claim 1, wherein the plurality of selectable options further include a plurality of different interference targets that enable a selection of at least one interference target, wherein the plurality of emulated interfering signals comprise at least one emulated signal based on the selected at least one interference target.

15. A system for emulating an interference environment, comprising:
   a memory;
   at least one transmitter; and
   a processor, coupled to the memory and the at least one transmitter, and configured with processor-executable instructions to perform operations comprising:
   providing a plurality of selectable options that enable generation of different interference environments to emulate, wherein the plurality of selectable options include a plurality of different interference environments;
   receiving one or more selected options from amongst the plurality of selectable options, wherein the one or more selected options include a selected interference environment;
   combining a plurality of emulated interfering signals accessed from the memory or automatically generated in response to receiving the one or more selected options, wherein the combined plurality of emulated interfering signals emulate interference present in the selected interference environment; and
   transmitting the combined plurality of emulated interfering signals using the at least one transmitter to generate the emulated interference environment for testing an interference immunity of at least one target device.

16. The system of claim 15, wherein the plurality of selectable options further include a plurality of different interference sources that enable a selection of at least one particular interference source, wherein the plurality of emulated interfering signals comprise at least one emulated signal from the selected at least one particular interference source.

17. The system of claim 15, wherein the plurality of selectable options further include a plurality of different interference targets that enable a selection of at least one interference target, wherein the plurality of emulated interfering signals comprise at least one emulated signal based on the selected at least one interference target.

18. A device for emulating an interference environment, comprising:
   means for providing a plurality of selectable options that enable generation of different interference environments to emulate, wherein the plurality of selectable options include a plurality of different interference environments;
   means for receiving one or more selected options from amongst the plurality of selectable options, wherein the one or more selected options include a selected interference environment;
   means for combining a plurality of emulated interfering signals in response to receiving the one or more selected options, wherein the combined plurality of emulated interfering signals emulate interference present in the selected interference environment; and
   means for transmitting the combined plurality of emulated interfering signals to generate the emulated interference environment for testing an interference immunity of at least one target device.

19. The device of claim 18, wherein the plurality of selectable options further include a plurality of different interference sources that enable a selection of at least one particular interference source, wherein the plurality of emulated interfering signals comprise at least one emulated signal from the selected at least one particular interference source.

20. The device of claim 18, wherein the plurality of selectable options further include a plurality of different interference targets that enable a selection of at least one interference target, wherein the plurality of emulated interfering signals comprise at least one emulated signal based on the selected at least one interference target.

* * * * *